United States Patent [19]
Mariotti et al.

[11] 3,883,599
[45] May 13, 1975

[54] MANUFACTURE OF THIOPHENOLS

[75] Inventors: Jean Francois Mariotti; Jean Henri Blanc; Claude Thibault, all of Pau, France

[73] Assignee: Societe Nationale des Petroles d'Aquitaine, Paris, France

[22] Filed: Feb. 8, 1974

[21] Appl. No.: 440,844

[52] U.S. Cl....... 260/609 D; 260/668 D; 260/666 A
[51] Int. Cl............................................ C07c 149/28
[58] Field of Search................................. 260/609 D

[56] References Cited
FOREIGN PATENTS OR APPLICATIONS
6,805,737  3/1968  Japan
1,816,477  10/1969  Germany OTHER PUBLICATIONS
Nakazaki, J. Inst. Polytech, Vol. 2, pp. 19–22, (1951).

*Primary Examiner*—Elbert L. Roberts
*Attorney, Agent, or Firm*—Ostrolenk, Faber, Gerb & Soffen

[57] ABSTRACT

A method of producing a thiophenol, which consists in dehydrogenating the corresponding cyclohexylmercaptan by means of $SO_2$ in gaseous phase, in the presence of an inert gas, with a dehydrogenation catalyst, such as activated carbon, alumina or chromium oxide supported by alumina; the catalyst must have a specific area of at least 300 sq.m/g, particularly 300 to 2,000 sq.m/g, and preferably 800 to 1,500 sq.m/g. Temperature is in the range of 300° to 800°C and most advantageously 400° to 550°C. Best results are obtained with 5 to 20 mol percent of each of the reagents in the gaseous reaction mixture, and the amount of $SO_2$ moles is preferably equal to that of cyclohexylmercaptan moles. In the case of phenylmercaptan, production yields as high as 64 percent may be obtained.

15 Claims, No Drawings

MANUFACTURE OF THIOPHENOLS

The invention relates to a new process for the preparation of thiophenols, more particularly by dehydrogenation of the corresponding cyclohexyl mercaptans. It also comprises certain catalysts which are useful for carrying out this process.

The thiophenols are rare and costly products. Phenyl mercaptan and its derivatives are used in pharmacy, mainly as antihelminthics. They are also used as polymer stabilisers, promoters of chemical rearrangements and corrosion inhibitors. They are also employed as constituents of quick-drying ink, and also in photography.

Numerous attempts have been made during the last 100 years with a view to preparing thiphenols; however, these attempts are for the major part limited to laboratory preparations, which have not been able to be used in industrial manufacturing processes. Thus, it is possible to mention obtaining thiphenol by reaction between cyclohexane and sulphur vapour or even sulphur chloride. Among the preparations, there also appear the reaction between sulphur and phenyl magnesium bromide, and the reduction of polyphenylene disulphides with alkali or alkaline earth metals in liquid ammonia. Thiophenol can also be produced in an autoclave, either by hydrogenation of sodium benzyl sulphinate, or by reduction of nitrobenzene by sulphides of metals of the platinum group. This last method has the disadvantage that it cannot be continuously carried out.

The present invention is concerned with a new process of particular interest, which has the advantage of providing thiophenol with excellent yields.

The new process is characterised in that the mercaptan of cyclohexane, or of a substituted cyclohexane, is heated in the vapour state with sulphur dioxide, preferably mixed with an inert gas, in the presence of a dehydrogenation catalyst.

So as to obtain an appreciable dehydrogenation, it is proposed to heat the reaction mixture above 250°C and more particularly between 300° and 800°C.

As it is the simplest thiophenol, namely, phenyl mercaptan or phenyl thiol $C_6H_5$—SH, which is particularly desired, it is this thiophenol which is taken as the example in the present specification. However, the new process can likewise permit homologues of this thiophenol to be obtained, especially the thiocresols, thioxylenols, ethyl thiophenols, propyl thiophenols, butyl thiophenols or others, containing one or more alkyls or aryls on the benzene ring which carries the thiol —SH group. It is sufficient for this purpose to start from the corresponding, substituted cyclohexane mercaptan (cyclohexyl thiol).

Although it is known to use $SO_2$, in the presence of catalysts, for the dehydrogenation of hydrocarbons (U.S. Pat. Nos. 2 126 817, 2 720 550, 2 971 035), or tetrahydrothiophene (French Pat. No. 69.44 210), the application of this technique to compounds with a thiol group is unexpected, because of the known destruction of this group by heat. In actual fact, above 250°C and particularly between 300° and 500°C, the mercaptans are quickly decomposed ("Organic Chemistry of Bivalent Sulphur" by R. E. REID, Vol. 1, pages 110-113). Thus, for example, the cyclohexyl mercaptan is decomposed into $H_2S$ and cyclohexene. It thus seemed to be impossible to the person skilled in the art to heat a mercaptan so as to obtain anything but $H_2S$ and a corresponding hydrocarbon. On the other hand, the known action of $SO_2$ on $H_2S$ and on the —SH groups, with liberation of sulphur, further contributed to avoiding the use of $SO_2$ in contact with a mercaptan. Now the present invention is based just on the surprising fact that, under particular conditions, the concurrent action of heat and $SO_2$ on the mercaptans permits the cyclic mercaptan molecule to be aromatised with a good yield.

Hence, the process according to the invention can be carried out with varying proportions of cyclohexyl mercaptan, $SO_2$ and inert gas, but certain concentrations and certain relative proportions of these reagents are particularly suggested, so as to obtain at the same time a practically total conversion and a good selectivity as regards thiophenol.

The ratio of the partial pressures between $SO_2$ and cyclohexyl mercaptan has a very great influence, mainly on the rate of conversion. It may be between 0.2 and 3; optimal and even total conversions are obtained when this ratio is from 0.5 to 2 or, even better, equal to 1.

Although low contents, for example, 1 to 5 percent of $SO_2$ in the reaction medium are sufficient for causing a considerable dehydrogenation of the cyclohexyl mercaptan into thiophenol, and although it is also possible to use high proportions, for example, 90 percent, the preferred operating procedure according to the invention consists in using quantities of $SO_2$ such that the partial pressure of this gas, in the reaction phase, is from 3 to 50 percent, preferably from 5 to 20 percent or better still from 7 to 15 percent. When the $SO_2$ partial pressure is lower than 5 percent, the conversion of the cyclohexyl mercaptan is not total, even for an $SO_2$/cyclohexyl mercaptan ratio equal to or higher than 1. It is with partial pressures of $SO_2$ between 7 and 15 percent that the best selectivities as regards thiophenol are obtained and these can reach 65 to 70 percent. When the $SO_2$ partial pressure is increased, the selectivity as regards thiophenol decreases to the advantage of the benzene selectivity, which is formed as a consequence of the destruction of the —SH group of the mercaptan being used.

As regards the concentration of cyclohexyl mercaptan, this can vary between wide limits, particularly between 1 percent and 99 percent; however, a preferred form of the invention consists in using cyclohexyl mercaptan partial pressures which are between 2 and 50 percent and preferably between 5 and 20 percent; this partial pressure should also be as close as possible to that of the $SO_2$.

The diluting gas plays a very important part in the operation of dehydrogenating the cyclohexyl mercaptan into thiophenol. It could be visualised tht the $SO_2$ itself could serve as diluent; however, it cannot be used in proportions higher than those which have been proposed above, without leading to secondary oxidation reactions. Various non-oxidising gases can be used as diluents, for example, $CO_2$, steam and nitrogen.

The process according to the invention is carried out in the presence of a dehydrogenation catalyst, of which the preferred form is an active carbon having a large surface, of the order of 300 to 2,000 $m^2/g$ and preferably from 800 to 1,500 $m^2/g$. It may optionally be possible to use alumina and the other known dehydrogenation catalysts, or dehydrogenating oxidation catalysts, for example, chromium oxide deposited on alumina.

The good results obtained with catalysts having such a strong specific surface are all the more surprising, since it is recommended in the art, on the contrary, to use catalysts having a small specific surface, especially 0.6 to 100 m²/g, to dehydrogenate organic compounds, particularly cycloaliphatic compounds. As explained in French Pat. No. 69-41512 (publication No. 2 025 041), page 2, the largesurface catalysts assist the combustion reaction of the treated compound. However, experience has unexpectedly shown that the cyclohexyl mercaptans treated with $SO_2$, in the presence of catalysts with a specific surface from 0.6 to 100 m²/g, give an extremely small amount of corresponding thiophenol, whereas the good results are obtained with surfaces larger than 300 m²/g, as indicated in the examples of the present specification.

Under the operating conditions as described above, the catalyst remains stable, and no fall in activity has been found after it has been in operation for about 50 hours.

Although the temperature for dehydrogenating cyclohexyl mercaptan into thiophenol by means of $SO_2$ can vary between 300° and 800°C, the best results are obtained between 350° and 650°C and especially between 400° and 550°C. When the temperature is too low, there is a strong deactivation of the catalyst.

The reaction according to the invention requires a fairly short contact time, of the order to 0.1 to 5 seconds. Obviously, this time depends on the temperatue at which the operation takes place. At 450°C, it is preferably from 0.2 to 2 seconds or, even better, from 0.5 to 1.5 seconds. If the contact time is increased, the selectivity as regards thiphenol decreases to the benefit of that of benzene.

The invention is illustrated by the following non-limitative examples.

EXAMPLES 1 to 4

A gaseous mixture of cyclohexyl mercaptan, $SO_2$ and nitrogen is caused to pass into a reactor, containing the catalytic mass composed of activated carbon with specific surface of 1,100 m²/g and heated to 450°C. The gas flow is regulated so that the contact time is 1.5 seconds. The operation is continued for about 50 hours. During these tests, the partial pressure of the cyclohexyl mercaptan is kept constant, while the pressure of $SO_2$ and that of the nitrogen is caused to vary.

The following table indicates, in respect of each of the Examples 1 to 4, the composition of the gaseous phase in moles percent and the results which are given by the catalyst after operating for about 50 hours.

| Examples | 1 | 2 | 3 | 4 |
|---|---|---|---|---|
| Pressure: 1 atm | | | | |
| Composition of the gas in moles % | | | | |
| cyclohexyl mercaptan | 10 | 10 | 10 | 10 |
| $SO_2$ | 0 | 5 | 10 | 20 |
| $N_2$ | 90 | 85 | 80 | 70 |
| Conversion of cyclohexyl mercaptan % | 73 | 90 | 100 | 100 |
| Yields %: | | | | |
| thiophenol | 0 | 30 | 57.5 | 3.5 |
| cyclohexene | 30 | 17 | 2.5 | 1.5 |
| benzene | 43 | 43 | 40 | 95.0 |
| Thiophenol selectivity % | 0 | 33 | 57.5 | 3.5 |

Examples 5 to 7

In these examples, the partial pressure of $SO_2$ is kept constant and the pressure of cyclohexyl mercaptan and nitrogen is caused to vary. The temperature is 470°C and the contact time is 1.4 seconds, the other conditions remaining the same as in Examples 1 to 4.

| Examples | 5 | 6 | 7 |
|---|---|---|---|
| Pressure: 1 atm. | | | |
| Composition of the gas in moles % | | | |
| cyclohexyl mercaptan | 5 | 10 | 20 |
| $SO_2$ | 10 | 10 | 10 |
| $N_2$ | 85 | 80 | 70 |
| Conversion of cyclohexyl mercaptan % | 100 | 100 | 56 |
| Yields % : | | | |
| thiophenol | 24 | 52 | 10 |
| cyclohexene | 4 | 5 | 29 |
| benzene | 72 | 37 | 17 |
| Thiophenol selectivity % | 24 | 55 | 18 |

Examples 8 to 12

Tests similar to those of the previous examples were carried out on the gaseous composition which gives the best results, that is to say, cyclohexyl mercaptan/$SO_2$/$N_2$ = 10:10:80; the contact time and the temperature of the catalytic mass is caused to vary.

| Examples | 8 | 9 | 10 | 11 | 12 |
|---|---|---|---|---|---|
| Temperature (°C) | 425 | 450 | 460 | 460 | 475 |
| Contact time (seconds) | 0.75 | 1.5 | 1.1 | 1.5 | 1.3 |
| Conversion % of cyclohexyl mercaptan | 93 | 100 | 99 | 100 | 100 |
| Yield % : | | | | | |
| thiophenol | 64 | 55 | 56 | 40 | 53 |
| cyclohexene | 7 | 3 | 9 | 2 | 5 |
| benzene | 22 | 42 | 34 | 58 | 43 |
| Thiophenol selectivity % | 69 | 55 | 56 | 40 | 52 |

Examples 13 and 14

Two operations are carried out by way of comparison, all the conditions being those of Example 8, except that the catalyst has a much smaller specific surface:

| Example No. | 13 | 14 |
|---|---|---|
| Surface of catalyst in m²/g | 7 | 52 |
| Thiophenol yield | 2.1 | 2.7 |

We claim:

1. Method of producing a thiophenol, which consists in heating the corresponding cyclohexylmercaptan in vapor state with sulfur dioxide and an inert gas, at a temperature of 300° to 800°C, in contact with a dehydrogenation catalyst the specific area of which is at least 300 square metres per gram, the contact being maintained until a substantial portion of the cyclohexylmercaptan is converted into thiophenol.

2. Method according to claim 1, wherein the specific area of the catalyst is 300 to 2000 sq.m/g.

3. Method according to claim 2, wherein said specific area is 800 to 1,500 sq.m/g.

4. Method according to claim 3, wherein the temperature is 400° to 5500°.

5. Method according to claim 4, wherein the ratio of the partial pressure of sulfur dioxide to that of the cyclohexylmercaptan is in the range of 0.2 to 3.

6. Method according to claim 5, wherein said ratio at least approximately equals 1.

7. Method according to claim 2, wherein the concentration of sulfur dioxide in the reaction mixture is 1 to 90 mol percent.

8. Method according to claim 2, wherein the concentration of sulfur dioxide in the reaction mixture is 5 to 20 mol percent.

9. Method according to claim 2, wherein the concentration of cyclohexylmercaptan in the reaction mixture is 1 to 99 mol percent.

10. Method according to claim 2, wherein the concentration of cyclohexylmercaptan in the reaction mixture is 5 to 20 mol percent.

11. Method according to claim 1, wherein the dehydrogenation catalyst is alumina or chromium oxide supported by alumina.

12. Method according to claim 1, wherein the dehydrogenation catalyst is activated carbon.

13. Method according to claim 3, wherein the time of contact between the reaction mixture and the catalyst is 0.1 to 5 seconds.

14. Method according to claim 5, wherein said dehydrogenation catalyst is activated carbon.

15. Method of producing thiophenol, which consists in heating cyclohexylmercaptan in vapor state in admixture consists with sulfur dioxide and an inert gas at a temperature in the range of 400° to 550°C, in contact with an activated carbon catalyst having a specific area of 800 to 1,500 sq.metres per gram, the reaction mixture containing 5 to 20 mol percent of cyclohexylmercaptan, while the partial pressure of sulfur dioxide substantially equals that of cyclohexylmercaptan, the time of contact between the reaction mixture and the catalyst being in the range of 0.5 to 1.5 seconds.

* * * * *